United States Patent [19]

Kauss

[11] Patent Number: 5,077,975
[45] Date of Patent: Jan. 7, 1992

[54] CONTROL FOR A LOAD-DEPENDENTLY OPERATING VARIABLE DISPLACEMENT PUMP

[75] Inventor: Wolfgang Kauss, Lohr-Wombach, Fed. Rep. of Germany

[73] Assignee: Mannesmann Rexroth GmbH, Lohr/Main, Fed. Rep. of Germany

[21] Appl. No.: 519,191

[22] Filed: May 4, 1990

[51] Int. Cl.[5] ............................................ F16D 31/02
[52] U.S. Cl. ..................................... 60/452; 60/445; 60/446; 60/449
[58] Field of Search ................ 60/452, 449, 445, 450, 60/446, 448

[56] References Cited

U.S. PATENT DOCUMENTS

| | | | |
|---|---|---|---|
| 3,543,508 | 12/1970 | Schwab | 60/449 |
| 4,011,721 | 3/1977 | Yip | 60/445 |
| 4,103,489 | 8/1978 | Fletcher et al. | 60/448 X |
| 4,139,987 | 2/1979 | Budzich | 60/445 |
| 4,158,290 | 6/1979 | Cornell | 60/445 |
| 4,199,942 | 4/1980 | Kasper | 60/445 X |
| 4,293,284 | 10/1981 | Carlson et al. | 60/450 X |
| 4,364,230 | 12/1982 | Holmes | 60/452 X |
| 4,379,389 | 4/1983 | Liesener | 60/428 |
| 4,382,485 | 5/1983 | Kirkham | 60/450 X |
| 4,523,430 | 6/1985 | Masuda | 60/450 X |
| 4,528,813 | 7/1985 | Izumi et al. | 60/444 X |
| 4,658,584 | 4/1987 | Suzuki et al. | 60/452 X |
| 4,809,504 | 3/1989 | Izumi et al. | 60/449 X |
| 4,823,552 | 4/1989 | Ezell et al. | 60/445 X |
| 4,949,541 | 8/1990 | de Vietro | 60/448 X |
| 4,967,554 | 11/1990 | Kauss | 60/452 |
| 4,967,557 | 11/1990 | Izumi et al. | 91/446 |

FOREIGN PATENT DOCUMENTS 0010860 5/1980 European Pat. Off. .
1801137 4/1970 Fed. Rep. of Germany .
3001167 7/1981 Fed. Rep. of Germany .
3044515 6/1982 Fed. Rep. of Germany .
3208250 9/1983 Fed. Rep. of Germany .
3410071 10/1985 Fed. Rep. of Germany .
3413913 10/1985 Fed. Rep. of Germany .
3805287 8/1989 Fed. Rep. of Germany .

OTHER PUBLICATIONS

Backe, W.: Neue Möglichkeiten der Verdrängerregelung, o+ü Ölhydraulik und Pneumatik 32, 1988, Nr. 11, pp. 778-783.

Primary Examiner—Edward K. Look
Assistant Examiner—Todd Mattingly

[57] ABSTRACT

Disclosed is a preferably electrohydraulic control for a load-dependently operating variable displacement pump, which is equipped with a differential pressure control device for ensuring a predetermined pressure drop at the control edge of a directional valve integrated into the consumer supply line. The differential pressure control device has a servo valve, the valve spool of which can be brought out of a first position, increasing the output volume of the variable displacement pump, against the compressive force of a spring and of a control pressure led off from the supply pressure upstream of the directional valve, by the pump pressure into a second position, reducing the output volume. In order to be able to adapt the volume flow control to the different requirements of various consumers, in particular of a mobile piece of equipment, such as for example a farming tractor, and thereby improve the quality of the control, the control pressure effective at the servo valve is arbitrarily influenced by means of a separately controllable actuating device, preferably designed as a servo valve.

15 Claims, 2 Drawing Sheets

CONTROL FOR A LOAD-DEPENDENTLY OPERATING VARIABLE DISPLACEMENT PUMP

BACKGROUND OF THE INVENTION

The invention relates to a control for a load-dependently operating variable displacement pump.

Such a control is used in the case of so-called load-sensing hydraulic systems in order to control the volume flow delivered by the variable displacement pump according to the actual requirements of the consumers to be supplied. For this purpose, it is necessary to keep the pressure drop at the control edge or the control edges of the directional valve connected upstream of the at least one consumer, which valve is frequently designed as a proportional directional valve or servo valve, at a predetermined value, i.e. to set a control pressure drop or a control pressure difference which is effective at the consumer. Serving this purpose is the differential pressure control device which, by constant or continuous relieving and loading of an actuating element of the variable displacement pump adapts the volume flow of the latter to the actual consumer requirements.

The invention is based on such a load-sensing variable displacement pump control loop, which is diagrammatically represented by the prior art shown, for example, in U.S. Pat. No. 4,011,721, and in FIG. 1.

In FIG. 1, the reference symbol 2 denotes a variable displacement pump, which is driven for example by the engine of a mobile piece of equipment, such as for example a farming tractor, and feeds a consumer supply line or pump line 4, which is led to a consumer (not shown in any more detail), such as for example a power lift, a working piston of the steering, to the trailer braking system or to a control unit of the suspension hydraulics. The consumer supply line 4 is led via a directional valve 6, designed here as a 5/3-way proportional directional valve, which has an inlet connection 8, a tank connection 10, two working connections 12 and 14 as well as a connection 16 for a load-indicating line 18. The load-indicating line 18 is connected to a control surface 20 of a differential pressure controller 30, which is designed as a 3/2-way servo valve. The other control surface 22 is pressurized via a control line 24 by the pump pressure P in the consumer supply line 4 and can be displaced out of the position A shown by the force of the pressure acting on the control surface 22 against the force of a control spring 26, which adds to the force of the pressure occurring via the load-indicating line 18 at the control surface 20, into the position B, in which a tank connection 28 is blocked and a control pressure line 34 leading to a working chamber 32 of the variable displacement pump 2 is connected to a further control line 36, carrying the pump pressure P, in order to influence the variable displacement pump 2 in the sense of a controlled cutting-back of the output volume. 40 denotes a further servo valve, which can be displaced out of a position C, switching through the control pressure line 34, against the force of a restoring spring 42 by the coming into effect of the pump pressure P acting in a control line 44, into the position D, in which a control pressure line branch 34A is blocked and, via a further control line 46, a pressurization of the control pressure line 34 with the pump pressure P in the consumer supply line 4 takes place.

The proportional directional valve 6 has three main switching positions E, F and G, it being possible for the spool valve to be centred in the neutral position F by the springs 48 and 50 and displaced by suitable electric or hydraulic activation into the two other switching positions E and G, in order to effect a reversal of the admission of pressure to the working connections 12 and 14. In the switching positions E and G, the connection 16 of the load-indicating line 18 is in each case connected to the inlet connection 8, so that the pressure effective at the consumer prevails in the load-indicating line 18. In the neutral position F, the connection 16 of the load-indicating line is connected to the tank connection T, so that the load-indicating line 18 is relieved. Upon displacement of the proportional directional valve 6 out of the neutral position F, a control pressure drop occurs at the control edge of this valve, the set value of which drop is predetermined by the force of the control spring 26 of the differential pressure controller 30. In the neutral position F, in which the load-indicating line 18 is switched to the tank, the variable displacement pump 22 goes into so-called standby operation, the control spring 26 in this case determining the standby pressure. The servo valve 40 acts in the sense of a pressure limitation on the varying mechanism of the pump 2, i.e. on the working chamber 32, if the pump pressure P exceeds a maximum pressure. This limit pressure can be predetermined by the spring 42.

A pump controlled in this way is used in mobile pieces of equipment, such as for example farming tractors, bulldozers or the like, for supplying a wide variety of consumers, such as for example the steering, the power lift, the trailer braking system, the suspension hydraulics and other additional control units, which however also invariably make different requirements on the volume flow control. For instance, steering, power lift and trailer braking system in each case operate in master closed control loops, on which high requirements are made regarding speed of response and stability. The various switching functions of the suspension hydraulics additionally require the provision of relatively large volume flows in a short time. Often the entire pump output volume must be made available to the additional control units.

BRIEF DESCRIPTION OF THE INVENTION

To be taken into consideration as a further important boundary condition in the case of such pump controls is that the speed of response of the control must be in effect even at very low motor speeds, in particular with a view to an adequate steering and switching function of the suspension hydraulics. On the other hand, it must be taken into consideration that, with increasing motor speed, the absolute output volume, and consequently also the loop gain of the volume flow control loop, rises, which may manifest itself in an increase in the tendency to oscillate and, at worst, result in an instability of the control. This risk must be taken into consideration in particular whenever very small volume flows have to be controlled, which is frequently the case where the power lift and the trailer braking system are concerned.

Until now, allowance could only be made for these different requirements if, for the setting of the control pressure difference for providing the load-sensing control (volume flow control), a compromise were made between the different operational requirements of the units to be supplied, by the characteristic of the control spring 26 being adapted to the predominantly occurring operational requirements. However, it has been found that such a compromise does not make allowance for the ever increasing requirements on the dynamics of the control. For nowadays, even at low speed, such a response capability of the controller is demanded that, at high speeds, there is a tendency towards oscillations of the control loop in the fine control range. Therefore, until now, there was no alternative but to choose as great a control pressure difference as possible, which however had the consequence that the design limit for the lowest standby pressure level, i.e. that which it was possible to achieve theoretically given the type of pump, could not be achieved because, once fixed, the control pressure drop also determined the standby pressure level. For this reason, until now increased energy losses had to be accepted.

In addition, it has been found that it was, in principle, difficult to provide adequately good control dynamics in the case of consumers which operate in closed control loops with constant reversal of the direction of action.

The invention is therefore based on the object of providing a control for a load-dependently operating variable displacement pump of the type described at the beginning which ensures an increased stability at all operating points of the variable displacement pump, even if consumers having extremely different requirements on the control are supplied.

By the measures according to the invention, it is achieved that, while operation is running, the control pressure drop can be influenced selectively in such a way that the output capacity of the control is adapted optimally to the respective operating point of the consumer on the one hand and/or of the variable displacement pump on the other hand. It is thus, for example, possible to fix the control pressure difference for maximum speeds of the variable displacement pump in such a way that no instability occurs. With decreasing speed, the control pressure effective at the servo valve is then influenced in such a way that the control pressure difference is raised, in order to obtain a fast response behaviour, i.e. good control dynamics as well as an adequate gain in the load-sensing range, at slow speeds as well. The measures according to the invention also create the prerequisite for it to be possible to adapt the control pressure drop to the respectively most important consumer of the mobile piece of machinery. At the same time the additional advantage is obtained that the control spring of the servo valve can be designed solely with a view to a standby pressure which brings with it minimum possible pressure losses.

The arbitrary influencing of the control pressure effective at the servo valve by means of a separately controllable actuating device, together with the use of a servo valve, integrated into the consumer supply line, with neutral centring position, results in the additional advantage that the oil column in the load-indicating line does not have to be relieved each time the servo valve passes through the neutral position. As a result, a substantial improvement in the control dynamics is obtained, which at the same time drastically reduces the dynamic material stressing of the components concerned, because a rapid loading and relieving of these components no longer occurs. This is all the more significant when the constant, even if brief relief of the load-indicating line also brings with it a relief of the oil column between variable displacement pump and servo valve. By the measures according to the invention, the possibility is provided of leaving the oil column between pump and servo valve uninfluenced upon passing through the neutral position, thereby obtaining an improvement in the control loop dynamics and at the same time a reduction in the dynamic pump stressing.

It has been found that the separately controllable actuating device can be readily designed in such a way that a setting of the control pressure drop effective at the consumer between zero and the maximum system pressure can be achieved. In this way, the entire spectrum which is demanded by the widest variety of consumers of a mobile piece of equipment, such as for example a farming tractor, is successfully covered.

A particularly advantageous further development of the control is obtained whenever the consumers are operated in closed control loops which operate with constant reversal of the direction of action. By the measures according to the invention, it is reliably avoided that the oil column between variable displacement pump and proportional directional valve is relieved upon each passage through neutral. It has been found that consequently a considerable improvement in the control loop dynamics can be achieved, there being the additional advantage that the pump stressing is also greatly reduced. The measures according to Patent Claim 2 create the prerequisite for a stepless setting of the control pressure drop effective at the consumer to be possible with a simple design of the actuating device, by the orifice being preloaded with pressures at different levels. In this way, it is possible to set the control pressure drop selectively between zero and the maximum system pressure. This means that it is possible, for example, in a certain position of the actuating device, to operate the pump as a constant pressure source, which is always advantageous whenever the load-sensing control tends towards instability, which is the case for example in the fine control range and at high drive speed.

In the simplest embodiment, the actuating device is designed as a directional valve, allowing a step-by-step change in the control pressure drop to be set. A simple stepless setting of the control pressure drop is obtained if the directional valve is designed as a proportional directional valve.

In this case, it is further of advantage to activate this proportional directional valve electrically, because the complexity of the circuitry of the hydraulic circuit can be further reduced as a result. In addition, this type of activation has the additional advantage, in particular in the case of electrically operated consumers, that the setting of the effective control pressure drop via the proportional directional valve is automatic, to be precise can be performed according to the respective operating state of the consumer on the one hand and/or of the variable displacement pump on the other hand. However, it is to be emphasised that it is, of course, also possible to reduce the tendency to oscillate of the hydraulic load-sensing control and to raise the output capacity even when the setting device is operated manually. In this way, improving the fine control properties of the consumer and selectively influencing and adapting the volume flow range in which the consumer can be stably controlled to the other boundary conditions can be accomplished.

A particular advantage of the subject of the invention is, in addition, that the control spring of the differential pressure controller no longer has to be matched to the maximum necessary control pressure difference, because a variable support of this control spring can be set during the course of operation by the measures according to the invention. This has the consequence that the standby pressure can be kept at a lower level with lower pump stressing and with lower energy loss.

DETAILED DESCRIPTION OF THE INVENTION

Figure 1:
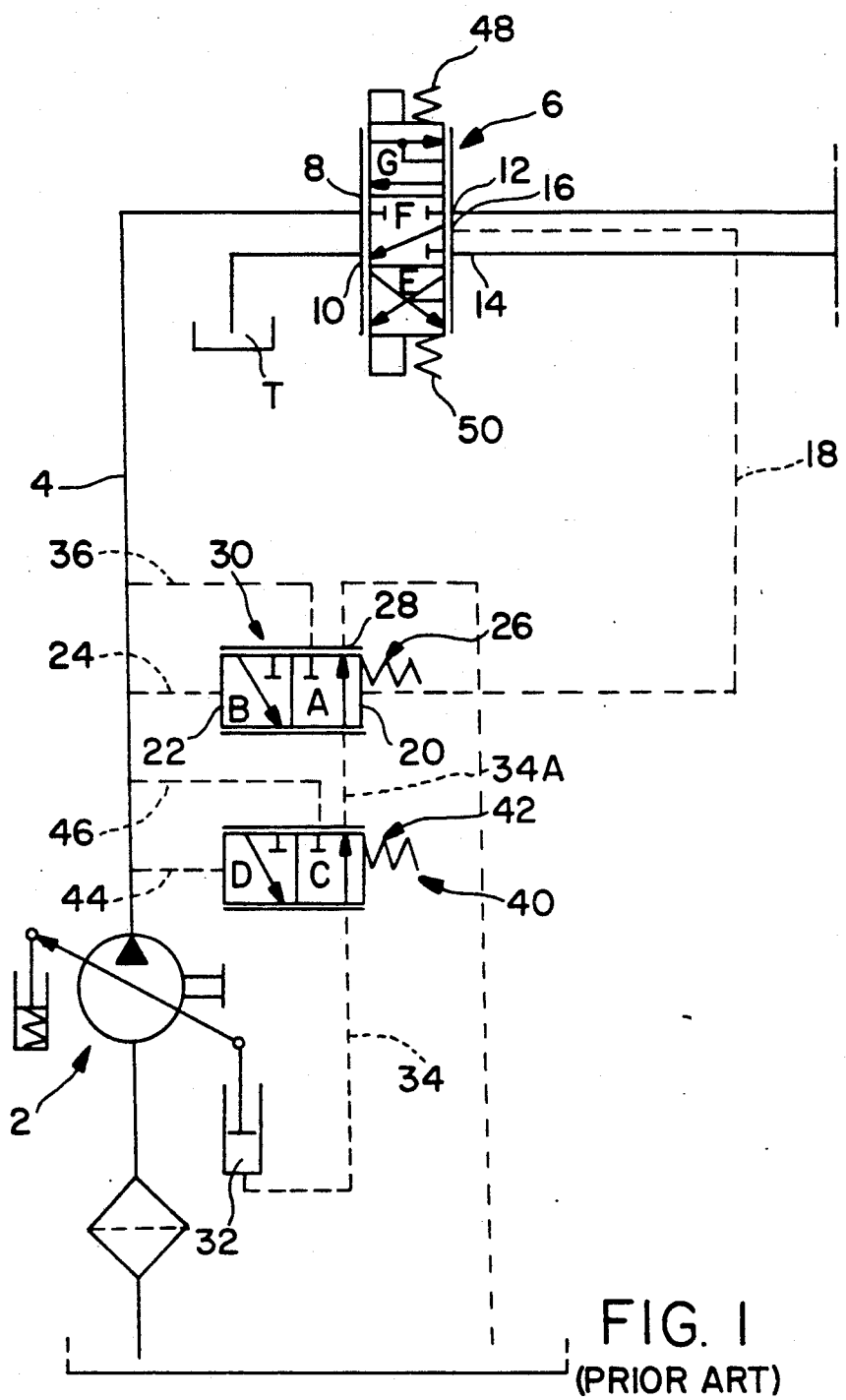
FIG. 1 diagrammatically shows a prior art load-sensing variable displacement pump control loop.
Figure 2:
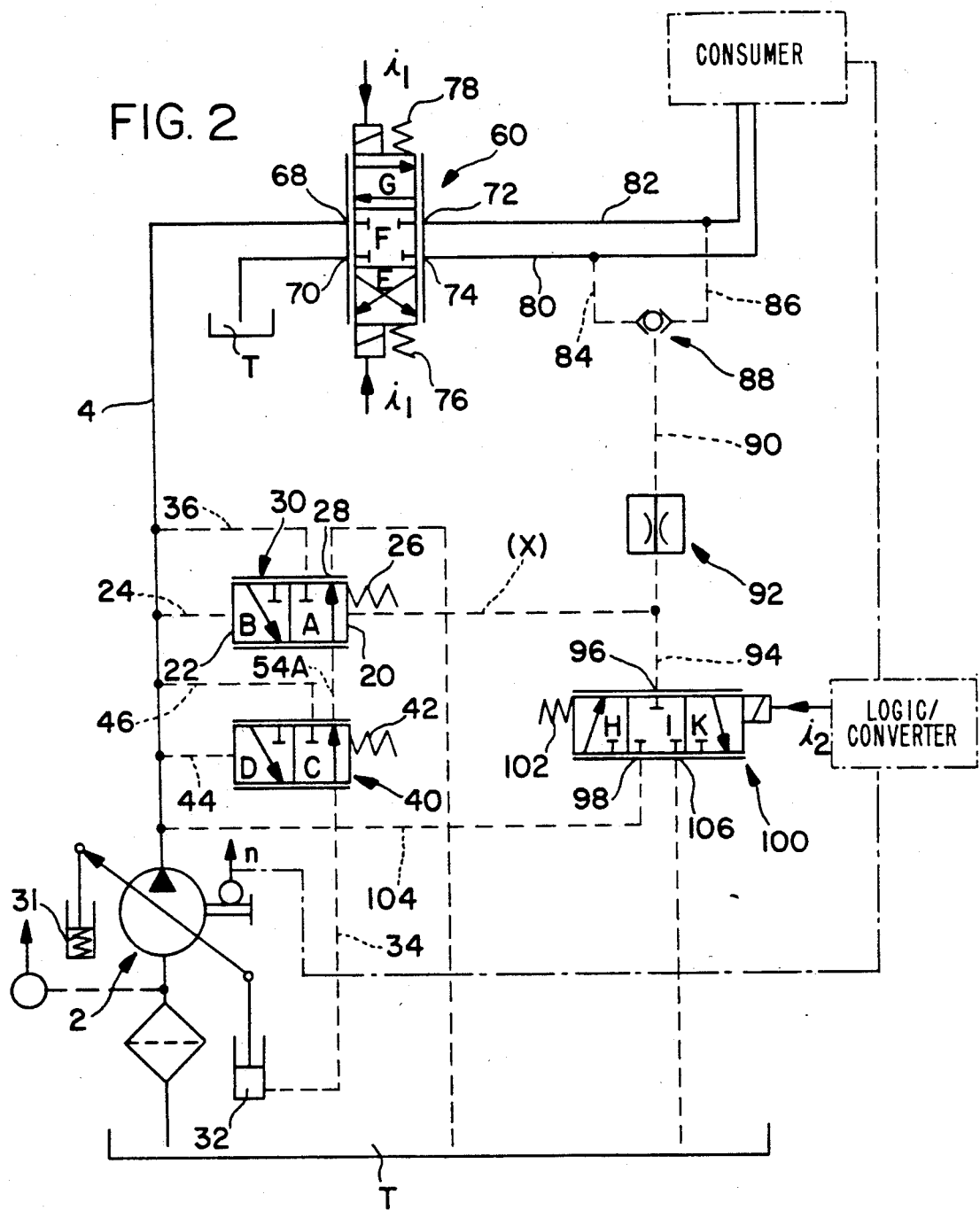
FIG. 2 diagrammatically shows a control loop for a load-sensing variable displacement pump according to the invention.

In FIG. 2, those components which are identical to the components of the hydraulic circuit according to FIG. 1 are denoted by the same reference symbols, so that a more detailed description of these elements is not necessary. Differences from the hydraulic circuit according to FIG. 1 exist in the area of the proportional directional valve 60 and in the manner in which the control surface 20 of the differential pressure controller 30 is pressurized with the control pressure x.

The servo valve 60, integrated into the consumer supply line 4, is designed as a 4/3-way proportional directional valve, which is electrically activated via the control signals $i_1$. The three switching positions are denoted by E, F and G. The proportional directional valve 60 has an inlet connection 68, a tank connection 70 and two working connections 72 and 74, to which pump pressure is alternately admitted. In this way, via the proportional directional valve 60, a consumer can be operated in a closed control loop in which a reversal in the direction of action is brought about by constant reversing of the proportional directional valve 60. In the neutral position F, shown in FIG. 2, which is maintained by the centring springs 76 and 78 coming into effect, for example for the case where the control signals $i_1$ are not present or are of the same size, all of the connections 68, 70, 72 and 74 are closed. In the switching position E, a working line 80, leading to the consumer, is connected to the inlet connection 68 of the consumer supply line 4, while the further working line 82, coming from the consumer, is relieved to the tank connection 70. In the switching position G, a corresponding reversal of pressurization takes place.

To ensure a predetermined pressure drop at the respectively effective control edge of the proportional directional valve 60, the respectively highest pressure in the working lines 80 and 82 is picked off. For this purpose, two branch control lines 84 and 86 are led to a selector valve 88, from which a load-indicating line 90 leads to the control surface 20 of the differential pressure control valve 30. Fitted into the load-indicating line 90 is a restrictor 92, the function of which is explained in detail later.

Downstream of the restrictor, there opens into the load indicating line 90, carrying the control pressure x of the differential pressure controller 30, a further control line 94, which leads to an outlet connection 96 of a 3/3-way proportional directional valve 100. This servo valve is preferably activated electrically via the control signal $i_2$, so that it can be displaced steplessly between the switching positions H, I and K, under the action of a restoring spring 102. The proportional directional valve 100 has, in addition, an inlet connection 98, which is pressurized with pump pressure P via a control line branch 104. 106 denotes a tank connection.

With such a design of the hydraulic circuit, the following mode of operation is obtained:

As long as the servo valve 100 is kept in the switching position I by the presence of a control signal $i_2$, which keeps the force of the spring 102 in balance, the circuit behaves like the load-sensing control according to FIG. 1. This means that the control spring 26 determines the respective control pressure drop at the control edge of the servo valve 60, so that a volume flow control can be carried out. Since, however, the load indicating line 90 is not relieved to the tank each time the servo valve 60 passes through the neutral position F, the oil column between pump 2 and valve 60 is also not relieved in this case, as a result of which an improvement in the control loop dynamics and a reduction in the dynamic pump stressing occurs. On the other hand, without additional precautions, the pump really should be operated in standby operation at a higher pressure level, because the respectively higher load pressure acts via the selector valve 88 on the control surface 20. In order to eliminate the resulting additional energy losses, for readying the variable displacement pump 2 for standby operation, the servo valve 100 is displaced into the switching position 100, in which a relief of the load indicating line 90 to the tank T takes place. The swinging-back of the pump, i.e. the reduction in output volume of the variable displacement pump 2 already takes place at a pressure level which is adequate to overcome the force of the control spring 26 by acting of the differential control pressure valve 30 on the control surface 22, so that the swinging-back process against the force of a restoring spring 31 can be initiated by switching-through of the control line 36 to the working chamber 32 of the variable displacement pump 2.

In the third switching position H of the servo valve 100, conversely an additional pressurization of the load indicating line 90 takes place, and consequently of the line carrying the control pressure x effective at the differential pressure controller 30. The control pressure x can in this way be raised to the extent that the pump can be operated as a constant pressure source, which is advantageous in particular whenever instabilities of the load-sensing control are in evidence. This operating mode is of advantage, for example, whenever the consumer is operated in the fine control range and the variable displacement pump 2 is running at high speed.

However, the switching positions H, I and K, described above, only represent limit switching positions. The design as a servo valve allows the spool valve to assume any intermediate positions, so that, together with the restrictor or orifice 92, a stepless setting of the control pressure x is possible within broad limits. The control pressure drop effective at the consumer can in this way be set between zero and the maximum system pressure. In order to ensure that the consumer, for example a power lift, is capable of holding the load in standby operation of the pump, it is of advantage to integrate a hydraulically releasable non-return valve in the working line leading to the consumer.

With the circuit according to the invention, which permits an arbitrary influencing of the control pressure x effective at the servo valve 30 during the operation of the consumers, the control spring 26 can be designed in such a way that stable control operation is obtained at full power. With falling speed, the control pressure difference is then raised by increasing pressurization of the control line 94 downstream of the orifice 92. The orifice 92 is consequently increasingly preloaded with reducing speed n of the variable displacement pump 2, so that, even at extremely low speeds, an adequate gain of the load-sensing control is obtained and a good speed of response, for example of the steering system and of the suspension hydraulics, is ensured even at low speeds. Dot-dashed lines indicate a signal flow, which is passed on the one hand from the variable displacement pump 2 via the speed signal n and on the other hand from the consumer to a signal logic or a signal converter, via which the control signal $i_2$ for the servo valve 100 is adapted automatically to the operating point of the pump 2 and/or of the consumer.

Of course it is possible, as a departure from the illustrative embodiment represented, to perform the setting of the effective control pressure drop manually, in order to reduce the tendency to oscillate of the hydraulic load-sensing control and to increase the output capacity. It is, for example, also possible to provide a customary directional valve instead of a servo valve 100, in order in this way to set an optimum control pressure difference only at predetermined operating points.

The invention consequently provides a preferably electrohydraulic control for a load-dependently operating variable displacement pump, which is equipped with a differential pressure control device for ensuring a predetermined pressure drop at the control edge of a directional valve integrated into the consumer supply line. The differential control pressure device has a servo valve, the valve spool of which can be brought out of a first position, increasing the output volume of the variable displacement pump, against the compressive force of a spring and of a control pressure led off from the supply pressure upstream of the directional valve, by the pump pressure into a second position, reducing the output volume. In order to be able to adapt the volume flow control to the different requirements of various consumers, in particular of a mobile piece of equipment, such as for example a farming tractor, and thereby improve the quality of the control, the control pressure effective at the servo valve is arbitrarily influenced by means of a separately controllable actuating device, preferably designed as a servo valve.

Various modifications in structure and/or function may be made by one skilled in the art to the disclosed invention without departing from the scope of the invention as defined by the claims.

What is claimed is:

1. Control for a load-dependently operating variable displacement pump, having a differential pressure control device for ensuring a predetermined pressure drop at at least one control edge of a directional valve integrated into the consumer supply line, the differential pressure control device having a servo valve, the valve spool of which can be brought out of a first position increasing the output volume of the variable displacement pump, against the compressive force of a spring and of a control pressure led off from the supply pressure upstream of the directional valve into a second position, reducing the output volume, wherein the control pressure effective at the servo valve can be influenced arbitrarily by means of a separately controllable actuating device and wherein the actuating device is formed by a valve means, the valve means having an outlet connection to a line carrying the control pressure and an inlet connection for a line carrying the pump pressure as well as a tank connection.

2. Control according to claim 1, wherein the directional valve, which in a neutral position closes all connections, and the control pressure is led off via an orifice from the respectively highest load pressure in the lines leading to a consumer downstream of the proportional directional valve, the effective pressure between orifice and servo valve being variable by means of the actuating device.

3. Control according to claim 1 or 2 wherein the actuating device is formed by a 3/3-way directional valve.

4. Control according to claim 3, wherein in a neutral position of the directional valve positions, either a pressure relief or a pressure pre-loading of the outlet connection takes place.

5. Control according to claim 4, wherein the directional valve is a preferably electrically activated proportional directional valve.

6. Control according to claim 5, wherein the control signal of the proportional directional valve is dependent on the speed of the variable displacement pump.

7. Control according to claim 5 wherein the spool valve of the proportional directional valve can be centered in the neutral position against the force of a spring.

8. Control according to claim 2 wherein the directional valve, integrated into the consumer supply line, is electrically activated.

9. Control according to claim 1 or 2 or 8 wherein the servo valve of the differential pressure control device is a 3/2-way servo valve which, in the first position indreases the output volume of the variable displacement pump, relieves to the tank a line leading to a working chamber of the variable displacement pump and, in the second position connects this line to the pump line, while at the same time blocking the tank connection.

10. Control according to claim 9, wherein the line leading to the working chamber of the variable displacement pump is lead via a pressure limiting valve, which admits pump pressure to this line and blocks a connection to the 3/2-way servo valve if a set pump maximum pressure is exceeded.

11. Control according to claim 10, wherein the pressure limiting valve is formed by a 3/2-way directional valve, the valve spool of which can be displaced out of a flow position, connecting the connection to the working chamber of the variable displacement pump to a connection leading to the 3/2-way servo valve, against the force of a spring by the pump pressure into the other position in which a pump pressure connection to the working chamber is switched through.

12. Control according to claims 1 or 2 or 8 wherein the variable displacement pump serves to supply consumers which are operated in a closed control loop.

13. Control according to claims 1 or 2 or 8 wherein the influencing of the control pressure effective at the servo valve preferably takes place automatically, dependent on the respective operating state of the consumer.

14. Control according to claims 1 or 2 or 8 wherein the control is in mobile commercial vehicles, such as for example, farming tractors or the like.

15. Control according to claim 6 wherein the spool valve of the proportional directional valve can be centered in the neutral position against the force of a spring.

* * * * *